United States Patent [19]

Feng et al.

[11] Patent Number: 5,361,645
[45] Date of Patent: Nov. 8, 1994

[54] SHIFT LEVER APPARATUS FOR USE IN BICYCLE

[75] Inventors: Chan-Hua Feng; Jiann-Chyun Kang, both of Hsinchu, Taiwan, Prov. of China

[73] Assignee: Industrial Technology Research Institute, Hsinchu, Taiwan, Prov. of China

[21] Appl. No.: 110,888

[22] Filed: Aug. 24, 1993

[51] Int. Cl.$^5$ .......................... F16C 1/10; G05G 11/00
[52] U.S. Cl. ...................................... 74/502.2; 74/489; 74/488; 74/577 R; 74/575
[58] Field of Search ......... 74/502.2, 489, 488, 74/475, 501.5, 575, 577 R, 577 M; 192/4 R

[56] References Cited

U.S. PATENT DOCUMENTS

| | | | |
|---|---|---|---|
| 5,012,692 | 5/1991 | Nagano | 74/489 |
| 5,186,072 | 2/1993 | Nagano | 74/502.2 |
| 5,203,213 | 4/1993 | Nagano | 74/475 |
| 5,213,005 | 5/1993 | Nagano | 74/502.2 |
| 5,241,878 | 9/1993 | Nagano | 74/489 |

FOREIGN PATENT DOCUMENTS

| | | | |
|---|---|---|---|
| 0485955 | 5/1992 | European Pat. Off. | 74/502.2 |
| 2-38199 | 2/1990 | Japan | 74/489 |
| 2-88384 | 3/1990 | Japan | 74/502.2 |
| 2-88385 | 3/1990 | Japan | 74/502.2 |

*Primary Examiner*—Vinh T. Luong
*Attorney, Agent, or Firm*—W. Wayne Liauh

[57] ABSTRACT

A shift lever apparatus for use in bicycles comprising first and second ratchet wheels and first and second switch levers, all of them being mounted on a main shaft. The first and second switch levers contain first and second ratchet pawls for engaging with the first and second ratchet wheels, respectively. The first and second ratchet wheels are connected to a cam via a gear set so as to cause the cam to rotate in forward and reverse directions, respectively. The outer periphery of the cam consists a plurality of spiral sectors, each of which having monotonically increasing radius, alternated with a plurality of circular sectors, each of which having constant radius. When a follower, which is provided in the shift lever apparatus, is in contact with one of the spiral sectors, a movement of the first or the second lever will cause the cam to rotate, in a forward or reverse direction, and the follower to pull or release the shifting cable according, thus allowing the derailleur to shift gear upward or downward.

4 Claims, 9 Drawing Sheets

SHIFT LEVER APPARATUS FOR USE IN BICYCLE

FIELD OF THE INVENTION

This invention relates to a shift lever apparatus for use in bicycle, that includes two switch levers for the control of two ratchets rotating in different direction so as to lead a disc cam in rotation to each different position and the rotation of the disc cam to each different position will lead a follower in tracting the shift cable that enables the bicycle derailleur apparatus to change into each different gear position.

BACKGROUND OF THE INVENTION

Generally speaking, most of shift levers for use in bicycle have a reciprocating shift lever that directly tracts the shift cable for leading the derailleur to guide the chain for bias shift to each sprocket of different sizes as to change into different gear ratio.

Because such shift lever is shifted by hand to each different position so as to shift the derailleur into each different sprocket, the manipulation that is achieved entirely subject to the operator's experience and feeling will cause him failing to accomplish right position of the shift lever in different shifts. Therefore, such shift lever has to depend on a shift cable directly pulled by the shift lever while the shift lever needs to be fixed by frictional force produced from a fixing device so as to avoid shift skip as a result of shift lever pulled by the shift cable back to the original position after shifting.

For this reason, during shifting the operator has suffered a labor-consuming work since he not only has to sustain tension force due to the derailleur driven by the shift cable but also has to overcome frictional force imposed upon the shift lever by the fixing device.

Because of the aforesaid reasons, in the operation of such derailleur will cause the operator failing to accomplish right position of shifting and labor-consuming operation will also cause the operator getting exhausted.

To overcome the aforesaid defects, there are some shift levers in the market that have adopted ratchet device as shifting mechanism, such as the U.S. Pat. No. 5012692 "Change-speed Lever Apparatus For Use In Bicycle" as filed by Masashi Nagano, wherein a switch lever is used for leading a rachet to push the rachet wheel in forward rotation so as to pull the shift cable in movement, whereby a shifting speed is achieved by the derailleur, and multi-brake gear that engages the ratchet wheel serves to prohibit it from pulling back by the shift cable. For back shifting, the brake gear will be released by means of another switch lever, whereby the ratchet wheel can be pulled back by the shift cable and returned to the former shift depending on its own resilience.

For shifting forward of such shift lever, because of positioning function of ratchet wheel, the shift lever may proceed in right shifting operation and switching each block of the shift lever will cause the derailleur moving forward by one shift; switching a plural blocks will cause the derailleur moving forward by several shifts. In addition, upon accomplishment of each shifting operation, the return of the shift lever to the original position will make easier for shifting in bicycle. Besides, fixing the shift lever by means of brake-gear ratchet wheel can omit the past way of fixing the shift lever with frictional force so that shifting position of the derailleur becomes much more precise while no shifting operation resistance will occur increasingly.

However, because of some limits from the mechanism of such shift lever, when back shifting operation that brake gear disengagment from the ratchet wheel has caused the ratchet wheel to move back by one block, an auxiliary brake gear is required for holding up the ratchet wheel so as to prevent excessive pulling of the ratchet wheel by the shift cable otherwise the blocks of back shifting will be out of control. For this reason an operating trouble is hence caused since back shifting operation can be accomplished by one block only each time. Further because the shift cable of the shift lever is pulled by the ratchet wheel, shifting forward operation is almost like a direct pulling of the shift cable with the switch lever, whereby shifting forward operation remains a labor-consuming job.

In view of the aforesaid defects found in the conventional shift levers in respect of operation, the inventor has devoted himself to research and development and finally has achieved the present invention successfully based on experience in making and marketing related products over the years.

SUMMARY OF THE INVENTION

One object of the invention is to provide a shift lever apparatus for use in bicycle that is labor-saving, convenient and accurate for the operation of shifting forward or backward.

Another object of the invention is to provide the shift lever apparatus for use in bicycle that is easy for operation and better in function.

These and other objects of the present invention will become apparent to those skilled in the art after considering the following detailed specification together with the accompanying drawings.

BRIEF DESCRIPTION OF THE DRAWINGS

FIG. 6-1 is a frontal partial view of the cam and follower of the present invention showing the match relationship between the cam and the follower at low speed shift.

FIG. 6-2 is a side partial view of the cam and the follower showing the state of the follower at low speed shift.

FIG. 7-1 is a frontal partial view of the cam and follower of the present invention showing the match relationship between the cam and the follower at high speed shift.

FIG. 7-2 is a side partial view of the cam and the follower showing the state of the follower at high speed shift.

DETAILED DESCRIPTION OF THE PREFERRED EMBODIMENT

Figure 1:
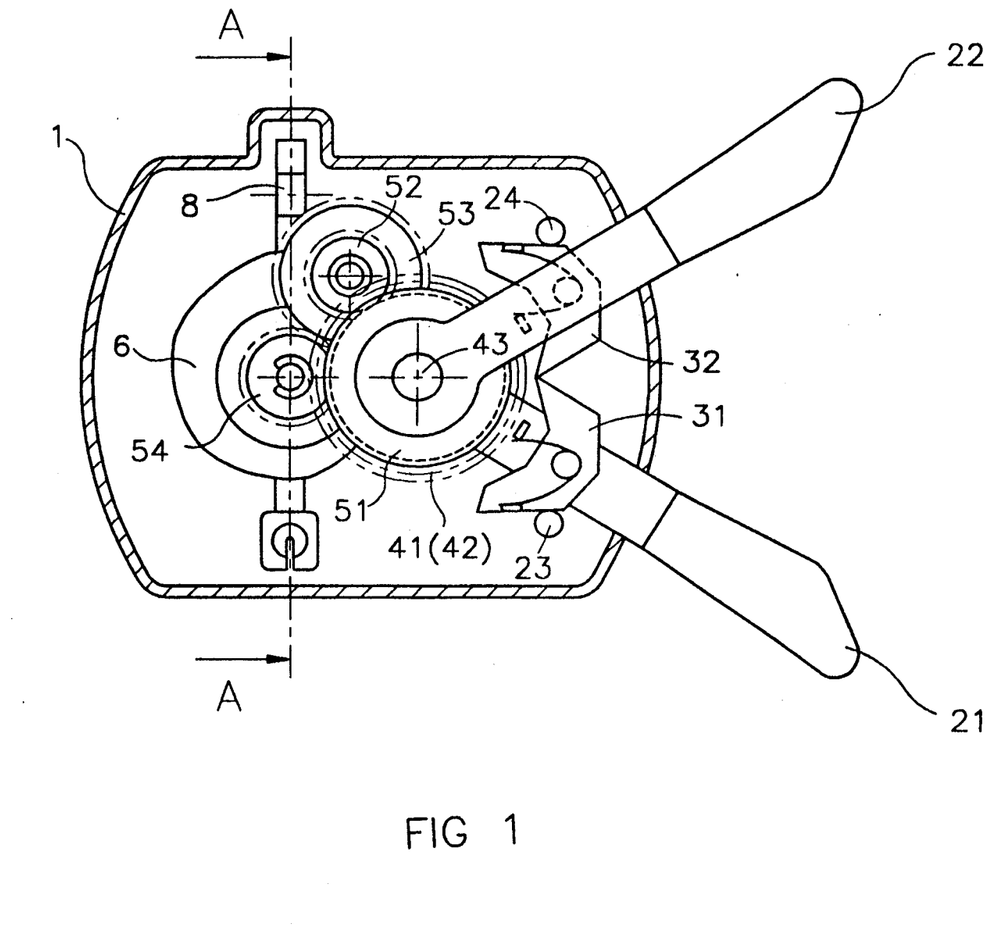
FIG. 1 is a top view showing the structure of the present invention.
Figure 2:
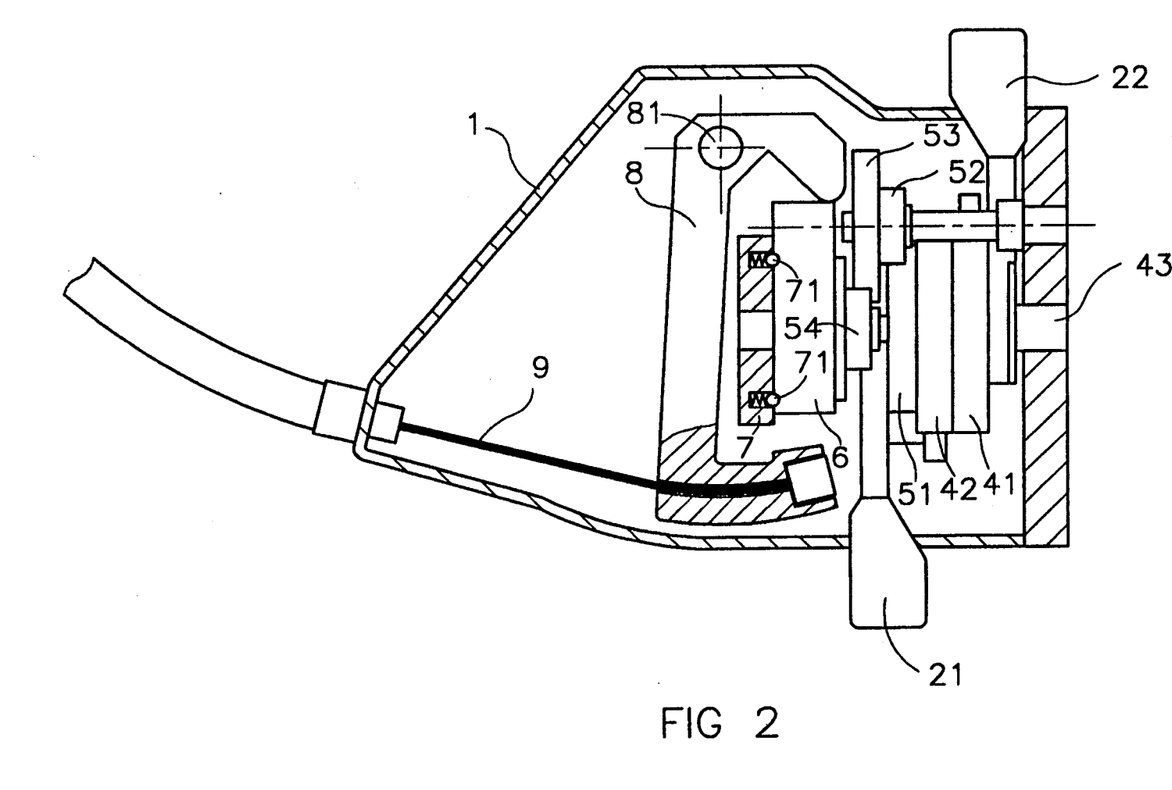
FIG. 2 is a cross sectional view along line 2—2 of FIG. 1 showing the structure of the present invention.

Referring to FIGS. 1 and 2, the shift lever apparatus for use in bicycle has two switch levers 21, 22 for the control of the derailleur to shift forward and backward respectively. Both switch levers 21, 22 have ratchet pawls 31, 32 respectively. When the switch levers 21, 22 are pushed by the operator, the ratchet pawls 31, 32 thereon will respectively drive the ratchet wheels 41, 42 on the shaft 43 to rotate in respectively different direction. The rotation of the ratchet wheels 41, 42 will then be transmitted to the transmission gear mechanism consisted of gears 51, 52, 53, 54 for driving a disc cam 6 in a positive or negative rotation to a selected position.

The periphery of disc cam 6, which is mounted on a cam shaft 55 is made to have an appropriate cam curve. Rotation of disc cam 6 to different angles may drive follower 8 to swing different positions so that the shift cable 9 is tracted to lead the shift of derailleur into various shift positions.

The use of the aforesaid mechanism in the present invention not only has achieved the purpose of allowing shifting operation to be performed in a secure manner and the result of easy operation, it also has provided labor-saving result in operation because of no limit from the mechanism irrespective of shifting forward or backward by means of the multiple shifts through each operation in order to make shifting operation easy and convenient in the manipulation of a bicycle.

Figure 3:
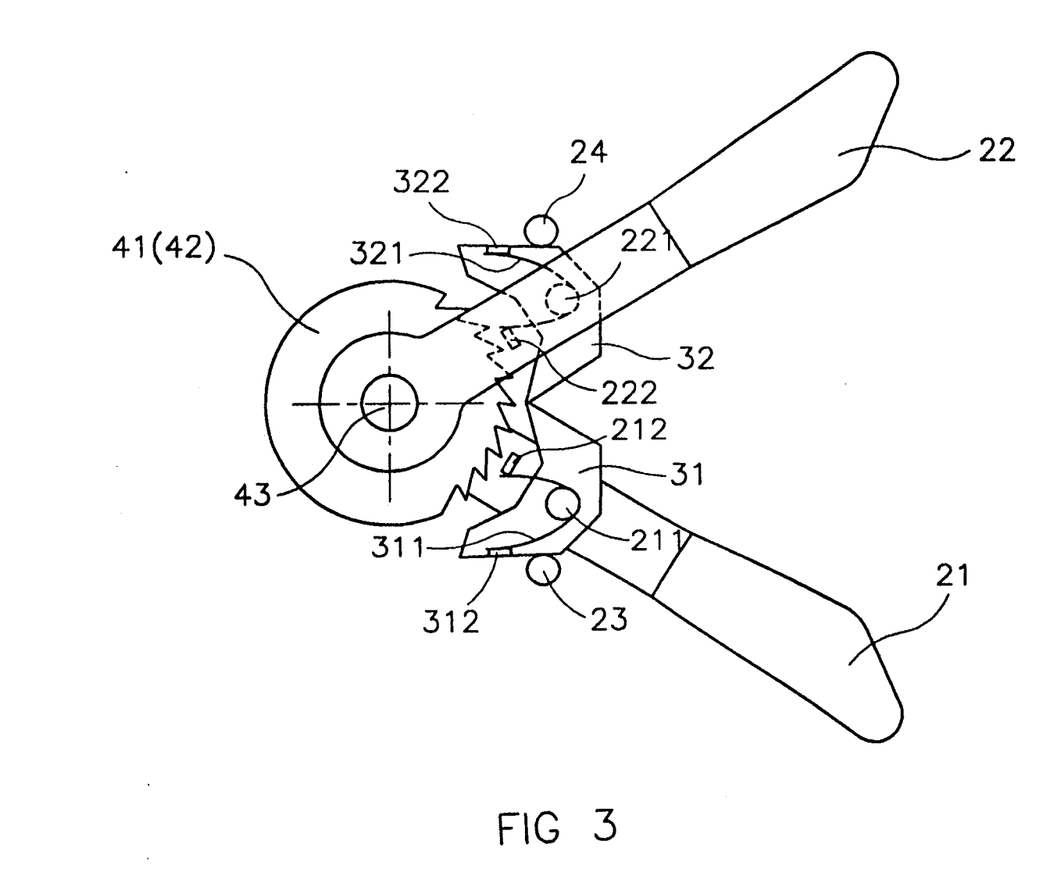
FIG. 3 is a partial view of the switch lever and the ratchet wheel of the present invention showing the position relationship among the rachet wheel, switch lever and the ratchet pawl.
Figure 4:
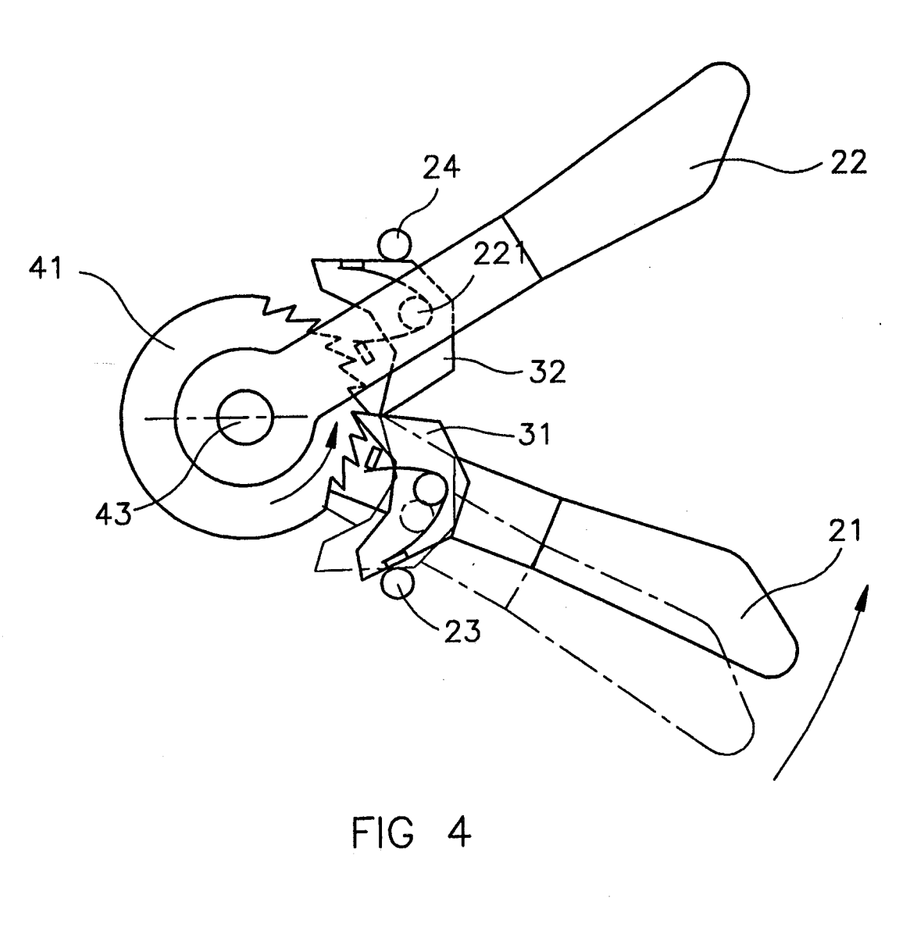
FIG. 4 is a diagramatic view of continuing action of FIG. 3 showing the function of the present invention to control shifting forward of the switch lever, ratchet wheel and the ratchet pawl.
Figure 5:
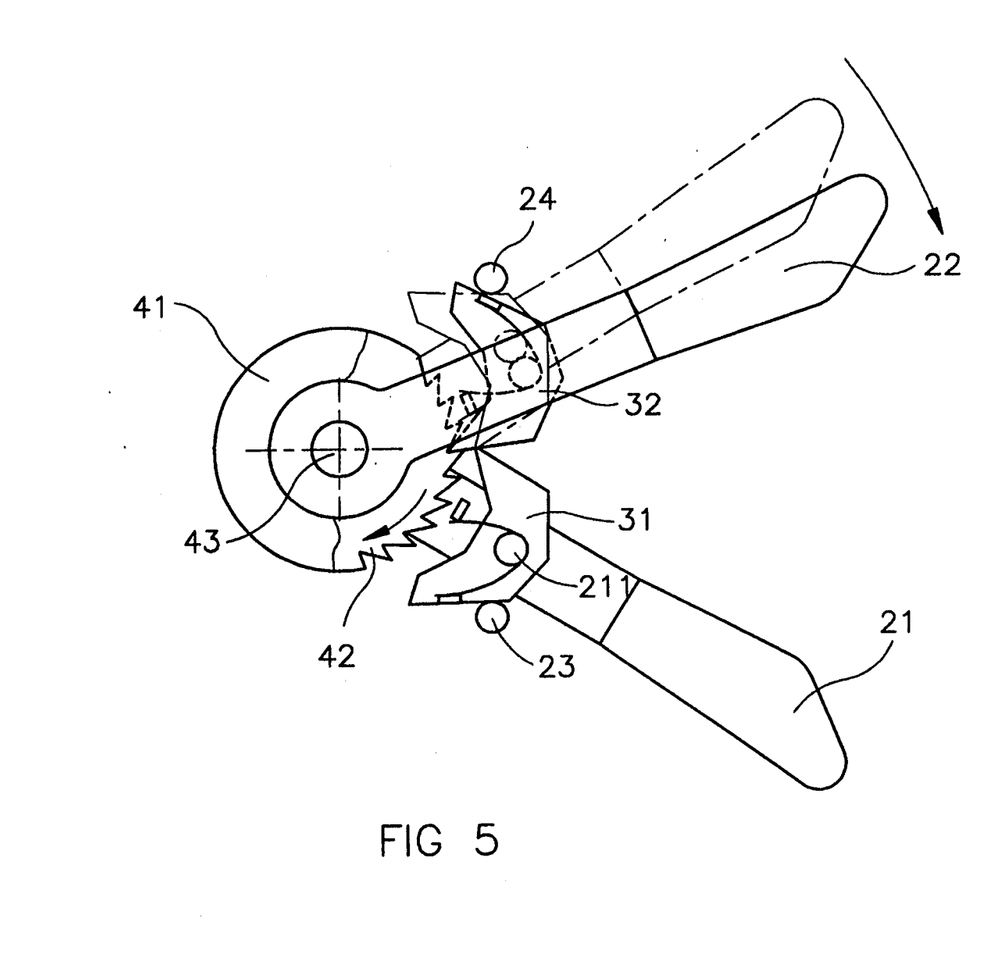
FIG. 5 is another diagramatic view of continuing action of FIG. 3 showing the function of the present invention to control shifting backward of the switch lever, ratchet wheel and the ratchet pawl.

Referring to FIGS. 3 through 5, ratchet wheels 41 and 42 are fixed onto a shaft 43 in an overlaying manner (as shown in FIGS. 1 and 2). The ratchet wheel 41 has bevel ratchet around its periphery, and ratchet wheel 42 located behind the ratchet wheel 41 has a similar bevel ratchet but in a opposite direction so that each offers one-way transmission for the ratchet pawls 31, 32 on the switch levers 21, 22 respectively to achieve rotation in different ways.

For driving the ratchet wheels 41, 42, both switch levers 21 and 22 are also mounted on the shaft 43 and on their intermediate portions there are pins 211, 221 respectively, for receiving ratchet pawls 31, 32 therein.

The ratchet pawls 31, 32 are swingingly mounted on the pins 211, 221 respectively. The sharp front edge of each of ratchet pawls 31, 32 is hence made for engaging with the ratchet of ratchet wheels 41, 42 respectively. When both ratchet pawls 31 and 32 are swinging to enable front edge to engage with the ratchet of ratchet wheels 41, 42, switch levers 21, 22 will drive the ratchet wheels 41, 42 to rotate.

The pins 211, 221 on switch levers 21, 22 have bow springs 311, 331 respectively and the ends of the bow springs 311, 331 are held against stoppers 212, 222 on the distal end of switch levers 21, 22 and stoppers 312, 322 on the distal end of ratchet pawls 31, 32 respectively. With the help of resilience of the bow springs, the ratchet pawls 31, 32 have a rotational torsion that enables them to engage with the ratchet of ratchet wheels 41, 42 respectively.

Referring to FIG. 3, when the switch levers 21, 22 are in their respective original positions, the back on distal end of ratchet pawls 31, 32 are held against the stop pins 23, 24 respectively, while the contact portion between them is bevel so that the ratchet pawls 31, 32 are limited by the stop pins 23, 24 to cause distal end of each disengaging with the ratchet of ratchet wheels 41, 42.

Referring to FIG. 4, when the operator turns the switch lever 21 in a counterclockwise manner, the position of ratchet pawl 31 relative to the stop pin 23 is hence changed so as to cause the ratchet pawl 31 to swing as a result of resilience of the bow spring 311 such that the front edge of ratchet pawl 31 will engage with the ratchet wheel 41, whereby the ratchet wheel 41 will be in rotation following the switch lever 21. And at the moment of ratchet wheel 41 in rotation, the ratchet pawl 32 on the other switch lever 22 will become disengaged with the ratchet wheel 42 therefore, it will not affect the rotation of ratchet wheel 41.

For shifting backward, it is accomplished through the control of another switch lever 22, wherein the switch lever 22, ratchet pawl 32 and ratchet wheel 42 are identical to the switch lever 21, ratchet pawl 31 and ratchet wheel 41, respectively in respect of construction and operation, except that the way of operation is opposite of each other, whereby upon the push of switch lever 22 the ratchet wheel 42 will be driven in a reversed rotation (FIG. 5) and further it will drive disc cam 6 to rotate to cause the derailleur to shift backward subject to the same range as that of shifting forward.

In addition, each of the distal ends of switch levers 21, 22 has a return spring (not shown). When the operator has accomplished shifting by releasing switch levers 21, 22, both of them will return to the original position immediately to be ready for next shifting in facility.

When the ratchet wheels 41, 42 are in rotation, the gear 51 on the shaft 43 will follow in rotation to drive the gears 52, 53, 54 in rotation, thus causing disc cam 6 to rotate in a positive/negative manner. Upon rotation of disc cam 6 the follower 8 will be driven in an angular displacement and swing around the pivotal shaft 81 and the cable is hence tracted to lead the speed changers into a change to various shifting positions.

Referring to FIGS. 6-1, 6-2, when the disc cam 6 and follower 8 are at the lowest shift condition, the tract arm 82 of follower 8 will be in an elevated position. When the disc cam 6 is moved to high speed a shifting position corresponding to a higher speed, the tract arm 82 of follower 8 will swing downward to lead the speed changer into high speed shift. When the derailleur reaches the maximum speed shift, the tract arm will be in an almost position, as shown in FIGS. 7-1, 7-2.

Figure 8:
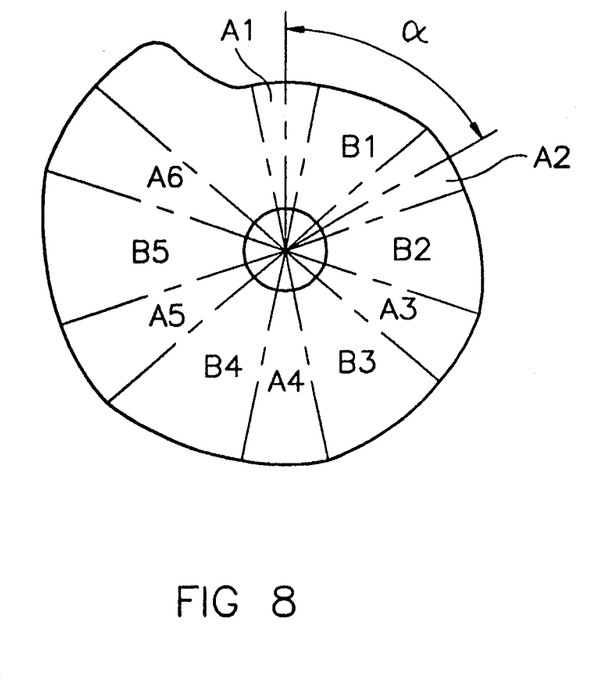
FIG. 8 is a frontal view of the cam of the present invention showing the shape of its profile curve.

Referring to FIG. 8, the operating means of disc cam 6 is determined subject to the number of shifts designed for the derailleur on a bicycle, for equi-angular rotation. As to the rotational angle for each shift of cam 6, it may include the range of staying angles i.e. circular sectors (areas A1, A2, A3, A4, A5, A6 shown), and the range of rising or decending angles i.e. non-circular sectors (B1, B2, B3, B4, B5 shown).

The profile curve for cam 6 within the range of B1, B2, B3, B4, B5 is a rising or decending curve. Within such range, upward or downward rotational movement in a certain range of angles will drive the follower 8 while causing the shift cable 9 in extensive displacement to lead the derailleur into shifting forward or backward. The profile curve for cam 6 in such a range of angles is staying curve. Upon rotation over the range of each staying angle, the derailleur will thus reach respective shifts.

After the derailleur has completed each shift, the return force provided thereon will cause the shift cable 9 to tract the follower 8 to prevent the shift cable 9 from pulling the follower 8 to cause shifting skip of the derailleur. For this reason, profile curve for cam 6 within the range of each staying angle is designed into a circular curve centering around the shift of cam 6 to enable that, at each shift position, negative force imposed by follower 8 against disc cam 6 will be passed to the shaft center in order to prevent disc cam 6 from negative drive which may be caused by the follower 8. Therefore, when disc cam 6 is in rotation to reach each shift, only a slight positioning will be required to prevent the risk of shifting skip.

The positioning of disc cam 6 is made by means of some spring-loaded locating balls 71 mounted on the seat 7, centering around the shaft center of cam 6 at invervals of rotational angle of cam 6. Contact surface between disc cam 6 and seat 7 has some concave points for setting in locating balls 71. When disc cam 6 has reached each shift position by rotation, only small force employed will be required to cause locating balls pressed down to allow disc cam 6 in free rotation.

With the aforesaid mechanism, when the operator is engaged in shifting, because of positioning function offered by locating balls 71 on the seat 7, disc cam 6 will be in position automatically during each shift to ensure shifting operation to be in a satisfactory manner. When disc cam 6 reaches each shift position, the positioning force of locating balls 71 alone will be sufficient to prevent shifting skip so as to allow the operator in the operation of such derailleur apparatus in a labor-saving manner.

When the operator is engaged in shifting, because of cooperation of gears 51, 52, 53 and 54, it would only require the operator to push the switch levers 21, 22 by a small angle to achieve sufficient rotational angle of disc cam for driving the derailleur to accomplish shifting; if the operator has pushed switch levers 21, 22 with a large angle, then greater angle in rotation of disc cam 6 will be caused so as to achieve multiple shifts, or even the maximum shift.

Because of identical construction and operation for switch lever 22, ratchet wheel 42, ratchet pawl 32 controlling back shift, relative to switch lever 21, ratchet wheel 41 and ratchet pawl 31 respectively, which control forward shift, multiple shifts may also be achieved with respect to shifting backward. This design is different from the conventional derailleur mechanism, which could achieve only one shift for each speed-change operation, because of the limit caused by ratchet wheel used as a shift lever.

Figure 9:
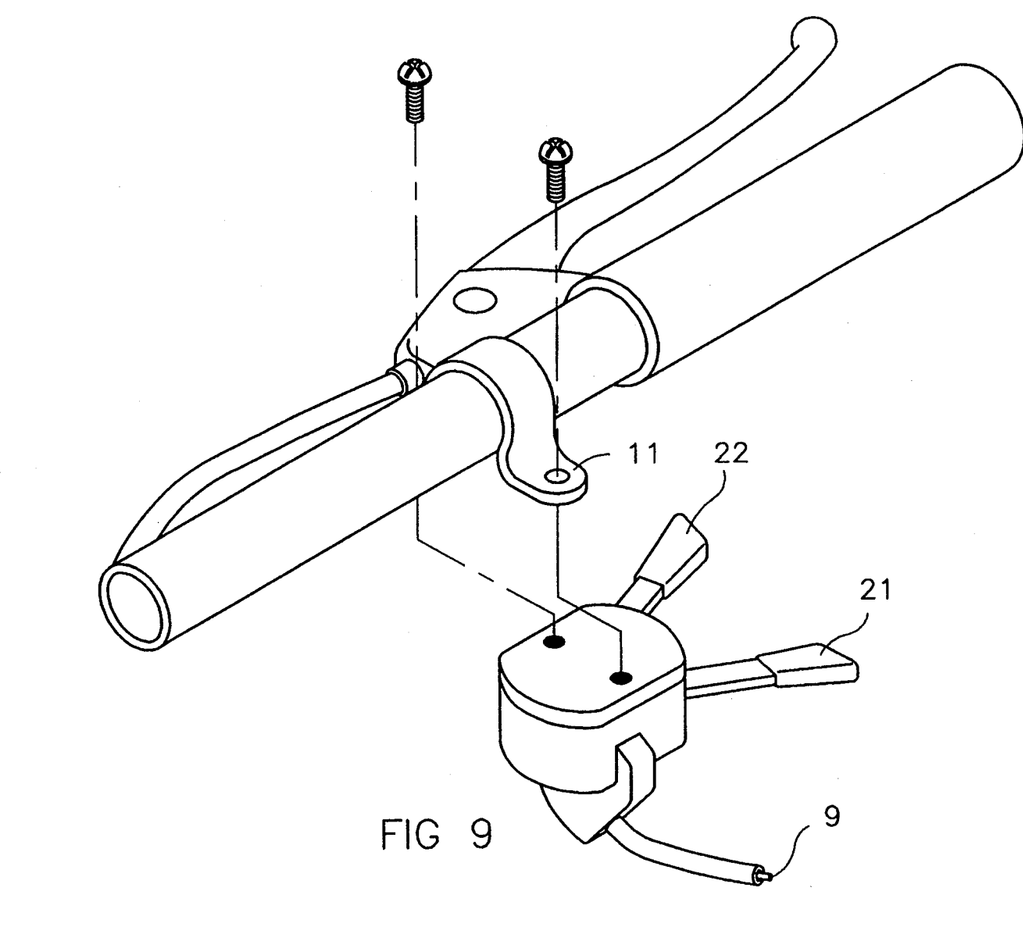
FIG. 9 is an elevational view of the embodiment of the present invention.
Figure 61:
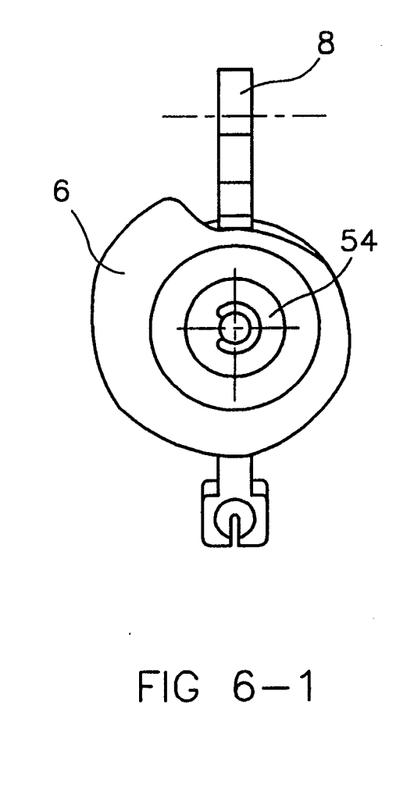
Figure 62:
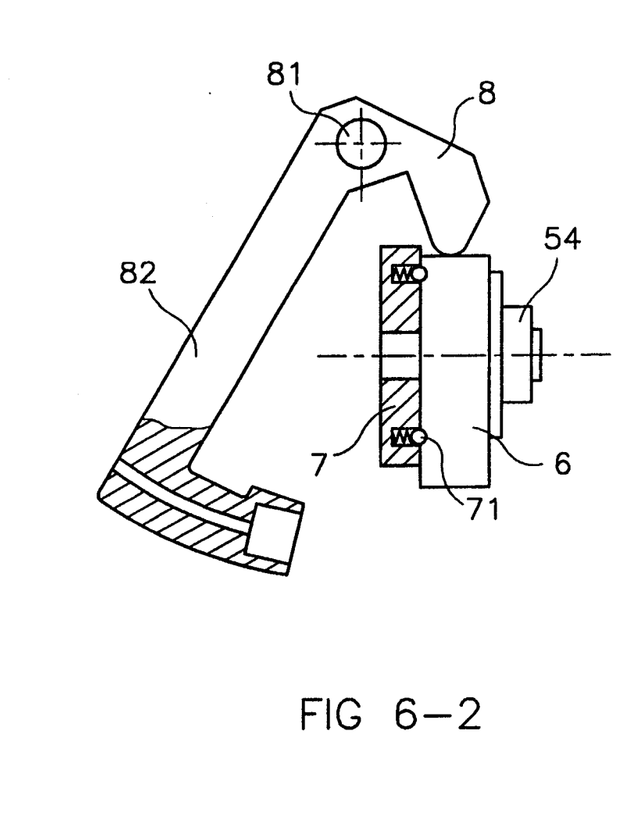
Figure 71:
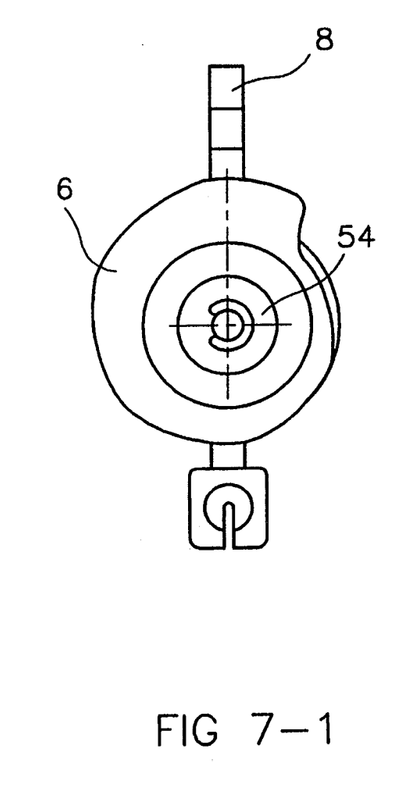
Figure 72:
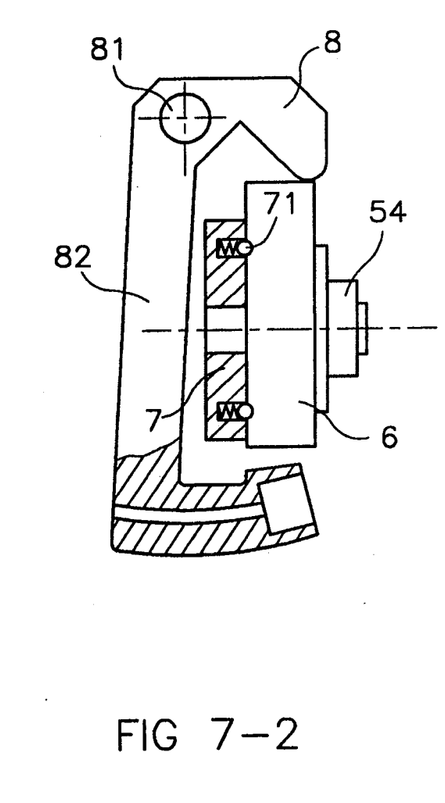

Referring to FIG. 9, all aforesaid mechanism and components can be mounted within a housing 1 and hence the derailleur apparatus can be fixed on the handle of bicycle by means of fastner 11 to facilitate the operator to push switch levers 21, 22 in easy manner.

We claim:

1. A shift lever apparatus for use in bicycle, comprising:
   a main shaft;
   a first ratchet wheel mounted on said main shaft, said first rachet wheel having a plurality of first bevel ratchets around its inner periphery;
   a second ratchet wheel also mounted on said main shaft, said second ratchet wheel having a plurality of second bevel ratchets around its inner periphery said second bevel ratchets having similarly shaped but reversed bevels relative to said first bevel ratchets;
   first and second switch levers mounted on said shaft in a reciprocally swinging manner for respectively causing said first and second ratchet wheels to remove said first and second switch levers being initially disposed in a first and second initial switch lever positions, respectively;
   first and second return springs for causing said first and second switch levers, respectively, to return to their initial positions;
   first and second ratchet pawls mounted on first and second switch levers, receptively, in a swinging manner for engaging with said bevel ratchets of said first and second ratchet wheels respectively;
   first and second limiting members for causing said first and second ratchet pawls to be disengaged from said bevel ratchets of first and second ratchet wheels, respectively, when said first and second switch levers being returned to their initial positions;
   a cam having an arcuate profile around its periphery;
   a follower driven by said cam and connected to a shift cable of the shift lever apparatus, said follower being provided to convert an angular displacement of said cam into a linear displacement of said shift cable; and
   a driven gear set connected to both said first and second ratchet wheels and said cam, said driven gear set being driven by said first and second ratchet wheels in order to cause said cam to rotate.

2. The shift lever apparatus for use in bicycle according to claim 1, wherein:
   said cam being mount on a cam shaft and said arcuate profile of cam periphery consisting of a plurality of spiral sector sections with increasing cam radius in a first direction alternated with a plurality of circular sector sections, and
   said spiral sector sections being constructed such that, when said follower is in contact with one of said spiral sectors, a rotation of said cam in said first direction will cause said follower to pull in said shift cable, and a rotation of said cam in a direction opposite to said first direction will cause said follower to release said shift cable.

3. The shift lever apparatus for use in bicycle according to claim 2, wherein each of said circular sectors having constant cam radius measured from said cam shaft so as to allow cause a force acted on said follower to be passed to said the cam shaft without causing said cam to rotate.

4. The speed-change lever apparatus for use in bicycle according to claim 1 which further comprising a positioning in cooperation with said cam to provide smooth shifting.

* * * * *